United States Patent
Rosen et al.

(10) Patent No.: US 8,887,486 B2
(45) Date of Patent: Nov. 18, 2014

(54) RAM AIR FAN INLET HOUSING

(75) Inventors: Seth E. Rosen, Middletown, CT (US); Eric Chrabascz, Longmeadow, MA (US); Victoria S. Richardson, Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 547 days.

(21) Appl. No.: 13/279,488

(22) Filed: Oct. 24, 2011

(65) Prior Publication Data
US 2013/0097996 A1 Apr. 25, 2013

(51) Int. Cl.
| | | |
|---|---|---|
| *F02K 3/02* | (2006.01) |
| *B64D 13/06* | (2006.01) |
| *F04D 29/52* | (2006.01) |
| *F04D 29/64* | (2006.01) |
| *F04D 29/70* | (2006.01) |
| *F02C 7/32* | (2006.01) |
| *F02C 7/04* | (2006.01) |

(52) U.S. Cl.
CPC . *B64D 13/06* (2013.01); *F02C 7/04* (2013.01); *F04D 29/522* (2013.01); *F04D 29/644* (2013.01); *F04D 29/701* (2013.01); *F02C 7/32* (2013.01); *Y02T 50/671* (2013.01); *B64D 2241/00* (2013.01); *Y02T 50/44* (2013.01)
USPC ........ 60/226.1; 137/15.1; 244/53 B; 415/200; 62/401

(58) Field of Classification Search
CPC ......... F02C 7/04; F02C 7/32; B64D 2033/02; B64D 29/06; B64D 13/06; B64D 2241/00
USPC .............. 137/15.1; 244/53 B; 60/226.1, 262; 415/200, 213.1, 220; 62/401, 402
See application file for complete search history.

(56) References Cited

U.S. PATENT DOCUMENTS

| | | |
|---|---|---|
| 1,940,466 A | 12/1933 | Sneed |
| 2,527,229 A | 10/1950 | Roubal |
| 2,752,515 A | 6/1956 | Baudry et al. |
| 3,410,029 A | 11/1968 | Savage |
| 3,433,020 A | 3/1969 | Earle, Jr. et al. |
| 3,588,044 A | 6/1971 | Reichrath et al. |
| 3,763,835 A | 10/1973 | Miller et al. |
| 3,915,024 A | 10/1975 | Mort |
| 3,949,550 A | 4/1976 | Albrecht et al. |
| 3,999,872 A | 12/1976 | Allison |
| 4,012,154 A | 3/1977 | Durwin et al. |
| 4,192,336 A * | 3/1980 | Farquhar et al. ............. 137/15.1 |
| 4,439,106 A | 3/1984 | Ferris et al. |
| 4,511,193 A | 4/1985 | Geczy |

(Continued)

OTHER PUBLICATIONS

Colson et al., U.S. Appl. No. 13/279,588, filed Oct. 24, 2011.

(Continued)

*Primary Examiner* — William H Rodriguez
(74) *Attorney, Agent, or Firm* — Kinney & Lange, P.A.

(57) ABSTRACT

A ram air fan inlet housing for containing a ram air fan rotor. The inlet housing includes a flanged surface and an interior surface. The flanged surface is perpendicular to an axis of the inlet housing and defines a flange plane at an axial end of the inlet housing. The interior surface is symmetric about the axis of the inlet housing and includes a flange section, a transition section, an outlet section, a rotor section, and an inlet section.

14 Claims, 4 Drawing Sheets

(56) References Cited

U.S. PATENT DOCUMENTS

| | | | |
|---|---|---|---|
| 4,543,785 A | 10/1985 | Patrick | |
| 4,979,872 A | 12/1990 | Myers et al. | |
| 5,239,815 A | 8/1993 | Barcza | |
| 5,311,749 A * | 5/1994 | McAuliffe et al. | 62/402 |
| 5,505,587 A | 4/1996 | Ghetzler | |
| 5,529,316 A | 6/1996 | Mattila | |
| 5,683,184 A | 11/1997 | Striedacher et al. | |
| 6,032,901 A * | 3/2000 | Carimali et al. | 244/129.4 |
| 6,299,077 B1 | 10/2001 | Harmon et al. | |
| 6,380,647 B2 | 4/2002 | Hayashi et al. | |
| 6,698,933 B2 | 3/2004 | Lau | |
| 6,769,864 B2 * | 8/2004 | Sathianathan et al. | 415/9 |
| 6,926,490 B2 | 8/2005 | McAuliffe et al. | |
| 6,928,963 B2 | 8/2005 | Karanik | |
| 6,966,174 B2 | 11/2005 | Paul | |
| 7,165,939 B2 | 1/2007 | Chen et al. | |
| 7,342,332 B2 | 3/2008 | McAuliffe et al. | |
| 7,394,175 B2 | 7/2008 | McAuliffe et al. | |
| 7,397,145 B2 | 7/2008 | Struve et al. | |
| 7,506,838 B2 * | 3/2009 | Porte | 244/53 B |
| 7,563,069 B2 * | 7/2009 | Harper | 415/9 |
| 7,757,502 B2 | 7/2010 | Merritt et al. | |
| 7,952,241 B2 | 5/2011 | Kato et al. | |
| 8,231,332 B2 * | 7/2012 | Vauchel et al. | 415/119 |
| 8,585,374 B2 * | 11/2013 | Beers et al. | 417/368 |
| 8,622,695 B2 * | 1/2014 | Decker et al. | 415/214.1 |
| 2002/0171218 A1 | 11/2002 | Bell | |
| 2005/0022501 A1 * | 2/2005 | Eleftheriou et al. | 60/226.1 |
| 2005/0150234 A1 * | 7/2005 | Urso et al. | 60/796 |
| 2006/0059889 A1 * | 3/2006 | Cardarella, Jr. | 60/226.1 |
| 2006/0061221 A1 | 3/2006 | McAuliffe et al. | |
| 2010/0055383 A1 | 3/2010 | Schalla et al. | |
| 2012/0014784 A1 * | 1/2012 | Hipsky et al. | 415/177 |
| 2013/0097997 A1 * | 4/2013 | Chrabascz et al. | 60/226.1 |
| 2013/0098045 A1 * | 4/2013 | Binek et al. | 60/767 |
| 2013/0101399 A1 * | 4/2013 | Chrabascz et al. | 415/142 |
| 2013/0101400 A1 * | 4/2013 | Binek et al. | 415/175 |
| 2013/0101402 A1 * | 4/2013 | Rosen et al. | 415/180 |
| 2013/0101433 A1 * | 4/2013 | Colson et al. | 416/244 R |
| 2013/0101435 A1 * | 4/2013 | Colson et al. | 416/245 R |
| 2013/0180220 A1 * | 7/2013 | McAuliffe et al. | 55/385.2 |
| 2014/0037441 A1 * | 2/2014 | Chrabascz et al. | 415/207 |
| 2014/0050574 A1 * | 2/2014 | Chrabascz et al. | 415/200 |
| 2014/0056718 A1 * | 2/2014 | Beers et al. | 416/97 R |
| 2014/0212273 A1 * | 7/2014 | Le Borgne | 415/119 |

OTHER PUBLICATIONS

Colson et al., U.S. Appl. No. 13/279,529, filed Oct. 24, 2011.
Colson et al., U.S. Appl. No. 13/279,538, filed Oct. 24, 2011.
Binek et al., U.S. Appl. No. 13/279,497, filed Oct. 24, 2011.
Binek et al., U.S. Appl. No. 13/279,508, filed Oct. 24, 2011.
Chrabascz et al., U.S. Appl. No. 13/279,523, filed Oct. 24, 2011.
Chrabascz et al., U.S. Appl. No. 13/279,534, filed Oct. 24, 2011.
Rosen et al., U.S. Appl. No. 13/279,576, filed Oct. 24, 2011.

* cited by examiner

RAM AIR FAN INLET HOUSING

BACKGROUND

The present invention relates to an environmental control system. In particular, the invention relates to an inlet housing of a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan.

As with any system aboard an aircraft, there is great value in an improved ram air fan that includes innovative components designed to improve the operational efficiency of the ram air fan or to reduce its weight.

SUMMARY

The present invention is ram air fan inlet housing for containing a ram air fan rotor. The inlet housing includes a flanged surface and an interior surface. The flanged surface is perpendicular to an axis of the inlet housing and defines a flange plane at an axial end of the inlet housing. The interior surface is symmetric about the axis of the inlet housing and includes a flange section, a transition section, an outlet section, a rotor section, and an inlet section.

DETAILED DESCRIPTION

Conventional ram air fan assemblies in environmental control systems (ECS) employ a fan housing that includes a forward, or inlet, section surrounding a fan rotor. In its most basic form, such an inlet section has a cylindrical profile with a diameter greater than a diameter of the fan rotor. The closer the fan rotor diameter approaches that of the inlet section diameter, the greater the efficiency (amount air flow for a given fan speed) of the ram air fan. However, if the tolerance is too close, the fan rotor may rub against the inlet section, resulting in damage to the inlet section and reduced fan efficiency. Once damaged, either by fan rubbing, or normal wear, replacement of the inlet section requires replacement of the entire fan housing. This is laborious and expensive process requiring removing the ram air fan assembly from the ECS and almost completely disassembling the entire ram air fan assembly. Finally, although rare, mechanical failure of a fan rotor, or rotor burst, can generate flying fragments with enough kinetic energy to exit the ram air fan assembly and cause considerable damage in the vicinity of the ram air fan assembly. Thus, a fan rotor requires some type of containment structure radially outward from the fan rotor to contain, or significantly slow down, flying fragments from the fan rotor in the event of a rotor burst. Containment structures are either integral with the fan housing, or a separate component installed around the fan housing. Generally, a separate component, such as a series of metal bands, adds weight and complexity, both particularly undesirable in an aircraft. Fan housings are manufactured with materials and methods optimized for the intricate shapes of a fan housing, for example, casting. However, casting is a poor choice for a containment structure due to the relatively low strength per weight of cast parts. Thus, to achieve the necessary level of containment, such an integral containment structure must be relatively heavy compared to a containment structure made with materials and methods optimized for strength.

The present invention is an inlet housing for a ram air fan that is a separate part from the fan housing. The inlet housing has an interior profile or contour specifically designed to enhance fan efficiency in the ram air fan assembly. In addition, the design and tolerances of the inlet housing are such that, when combined with known tolerances of the rest of the ram air fan assembly, the clearance between the fan rotor and the inlet housing is held to a narrow gap to enhance fan efficiency, while also keeping the risk of the fan rotor rubbing the inlet housing low. The region around the fan rotor necessarily experiences damage and wear over time from items (dust, sand, etc.) entering the ram air fan inlet and being propelled outward by impact with the fan rotor (in addition to occasional fan rubbing). As noted above, the region of the ram air fan around the fan rotor must be regularly replaced—a laborious and expensive process. With the present invention, only the inlet housing, which is easily accessible at the front of the ram air fan assembly, need be replaced, resulting in significant savings. Finally, the inlet housing includes an integral containment structure that provides a necessary level of protection for exterior components in the event of a rotor burst. Because the inlet housing is separate from the fan housing, it can be manufactured with techniques and materials better suited for containment purposes than the casting techniques and materials necessarily employed in the production of a fan housing. Thus, the containment structure is lighter, reducing the weight of the ram air fan assembly.

Figure 1:
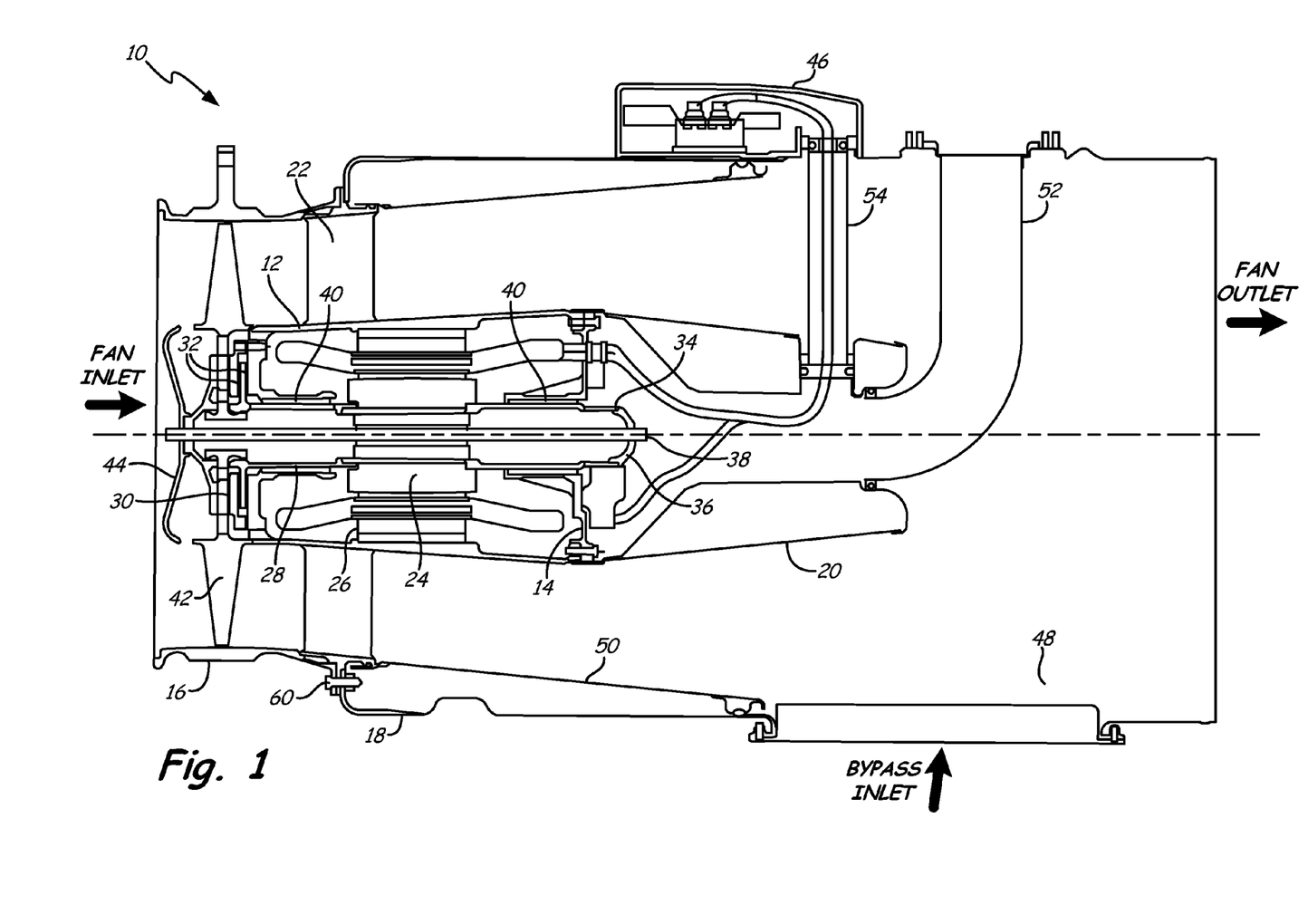
FIG. 1 is a side view of a ram air fan assembly incorporating the present invention.

FIG. 1 illustrates a ram air fan assembly incorporating the present invention. FIG. 1 shows ram air fan assembly 10 including fan housing 12, bearing housing 14, inlet housing 16, outer housing 18, and inner housing 20. Fan housing 12 includes fan struts 22, motor rotor 24, motor stator 26, thrust shaft 28, thrust plate 30, and thrust bearings 32. Bearing housing 14 includes journal bearing shaft 34 and shaft cap 36.

Fan housing 12 and bearing housing 14 together include tie rod 38 and journal bearings 40. Inlet housing 16 contains fan rotor 42 and inlet shroud 44, in addition to a portion of tie rod 38. Outer housing 18 includes terminal box 46 and plenum 48. Within outer housing 18 are diffuser 50, motor bearing cooling tube 52, and wire transfer tube 54. A fan inlet is a source of air to be moved by ram air fan assembly 10 in the absence of sufficient ram air pressure. A bypass inlet is a source of air to that moves through ram air fan assembly 10 when sufficient ram air pressure is available.

As illustrated in FIG. 1, inlet housing 16 and outer housing 18 are attached to fan housing 12 at fan struts 22 by a plurality of bolts 60. Bearing housing 14 is attached to fan housing 12 and inner housing 20 connects motor bearing cooling tube 52 and wire transfer tube 54 to bearing housing 14. Motor bearing cooling tube 52 connects inner housing 20 to a source of cooling air at outer housing 18. Wire transfer tube 54 connects inner housing 20 to outer housing 18 at terminal box 46. Motor stator 26 and thrust plate 30 attach to fan housing 12. Motor rotor 24 is contained within motor stator 26 and connects journal bearing shaft 34 to thrust shaft 28. Journal bearing shaft 34, motor rotor 24, and thrust shaft 28 define an axis of rotation for ram air fan assembly 10. Fan rotor 42 is attached to thrust shaft 28 with tie rod 38 extending along the axis of rotation from shaft cap 36 at the end of journal bearing shaft 34 through motor rotor 24, thrust shaft 28, and fan rotor 42 to inlet shroud 44. Nuts (not shown) secure shaft cap 36 to journal bearing shaft 34 on one end of tie rod 38 and inlet shroud 44 to fan rotor 42 at opposite end of tie rod 38. Thrust plate 30 and fan housing 12 contain a flange-like portion of thrust shaft 28, with thrust bearings 32 positioned between the flange-like portion of thrust shaft 28 and thrust plate 30; and between the flange-like portion of thrust shaft 28 and fan housing 12. Journal bearings 40 are positioned between journal bearing shaft 24 and bearing housing 14; and between thrust shaft 28 and fan housing 12. Inlet shroud 44, fan rotor 42, and a portion of fan housing 12 are contained within inlet housing 16. Diffuser 50 is attached to an inner surface of outer housing 18. Plenum 48 is a portion of outer housing 18 that connects ram air fan assembly 10 to the bypass inlet. Inlet housing 16 is connected to the fan inlet and outer housing 18 is connected to a fan outlet.

In operation, ram air fan assembly 10 is installed into an environmental control system aboard an aircraft and connected to the fan inlet, the bypass inlet, and the fan outlet. When the aircraft does not move fast enough to generate sufficient ram air pressure to meet the cooling needs of the ECS, power is supplied to motor stator 26 by wires running from terminal box 46, through wire transfer tube 54, inner housing 20, and bearing housing 14. Energizing motor stator 26 causes rotor 24 to rotate about the axis of rotation for ram air fan assembly 10, rotating connected journal bearing shaft 34 and thrust shaft 28. Fan rotor 42 and inlet shroud 44 also rotate by way of their connection to thrust shaft 28. Journal bearings 40 and thrust bearings 32 provide low friction support for the rotating components. As fan rotor 42 rotates, it moves air from the fan inlet, through inlet housing 20, past fan struts 22 and into the space between fan housing 12 and outer housing 18, increasing the air pressure in outer housing 18. As the air moves through outer housing 18, the air flows past diffuser 50 and inner housing 20, where the air pressure is reduced due to the shape of diffuser 50 and the shape of inner housing 20. Once past inner housing 20, the air moves out of outer housing 18 at the fan outlet. Components within bearing housing 14 and fan housing 12, especially thrust bearings 32, journal bearings 40, motor stator 26, and motor rotor 24; generate significant heat and must be cooled. Cooling air is provided by motor bearing cooling tube 52 which directs a flow of cooling air to inner housing 20. Inner housing 20 directs flow of cooling air to bearing housing 14, where it flows past components in bearing housing 14 and fan housing 12, cooling the components. Once the aircraft moves fast enough to generate sufficient ram air pressure to meet the cooling needs of the ECS, ram air is directed into plenum 48 from the bypass inlet. The ram air passes into outer housing 18 at plenum 48 and moves out of outer housing 18 at the fan outlet.

As shown in FIG. 1, inlet housing 16 is easily accessible at one end of ram air fan assembly 10, which greatly simplifies replacement of inlet housing 16, beginning with removal of ram air fan assembly 10 from the aircraft. Ram air fan assembly 10 is a line-replaceable unit (LRU). LRUs are designed to be installed and removed easily and efficiently such that a new unit can replace a unit in need of repair or inspection quickly, getting the aircraft back into service, while the LRU removed is taken elsewhere for repair or inspection. Inlet housing 16 is disconnected from fan housing 12 by removing bolts 60 that secure inlet housing 16 to fan housing 12. Once disconnected from fan housing 12, inlet housing 16 is simply removed. A replacement inlet housing 16 is installed by positioning inlet housing 16 such that flanged surface 100 (shown below in reference to FIGS. 2-3) abuts a corresponding flanged surface of fan housing 12. Positioning includes aligning bolt holes of inlet housing 16 to corresponding bolt holes of fan housing 12. Once positioned, inlet housing 16 is bolted to fan housing 12 with bolts 60. The final step is installing ram air fan assembly 10 with newly installed replacement inlet housing 16 back into the aircraft.

Figure 2:
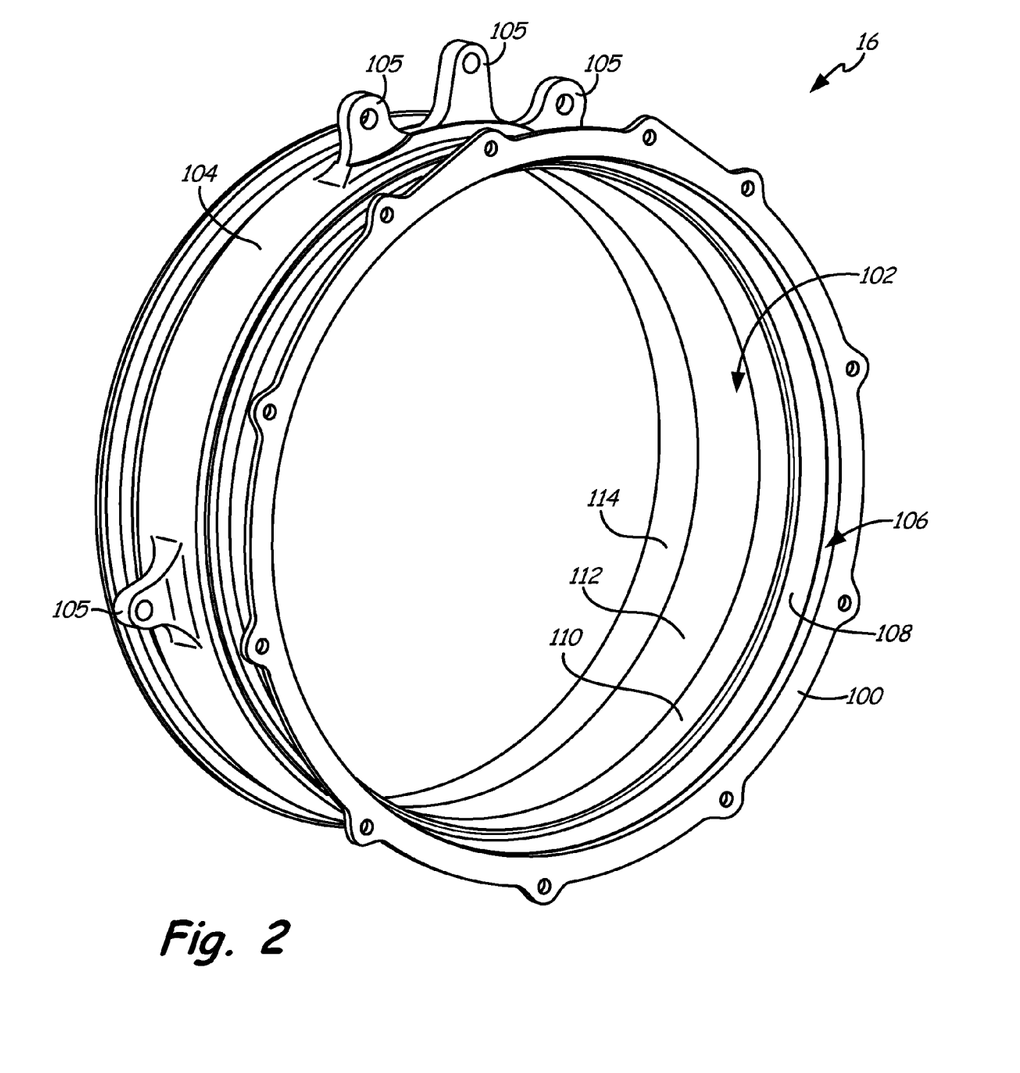
FIG. 2 is a perspective view of the inlet housing incorporating the present invention.
Figure 3:
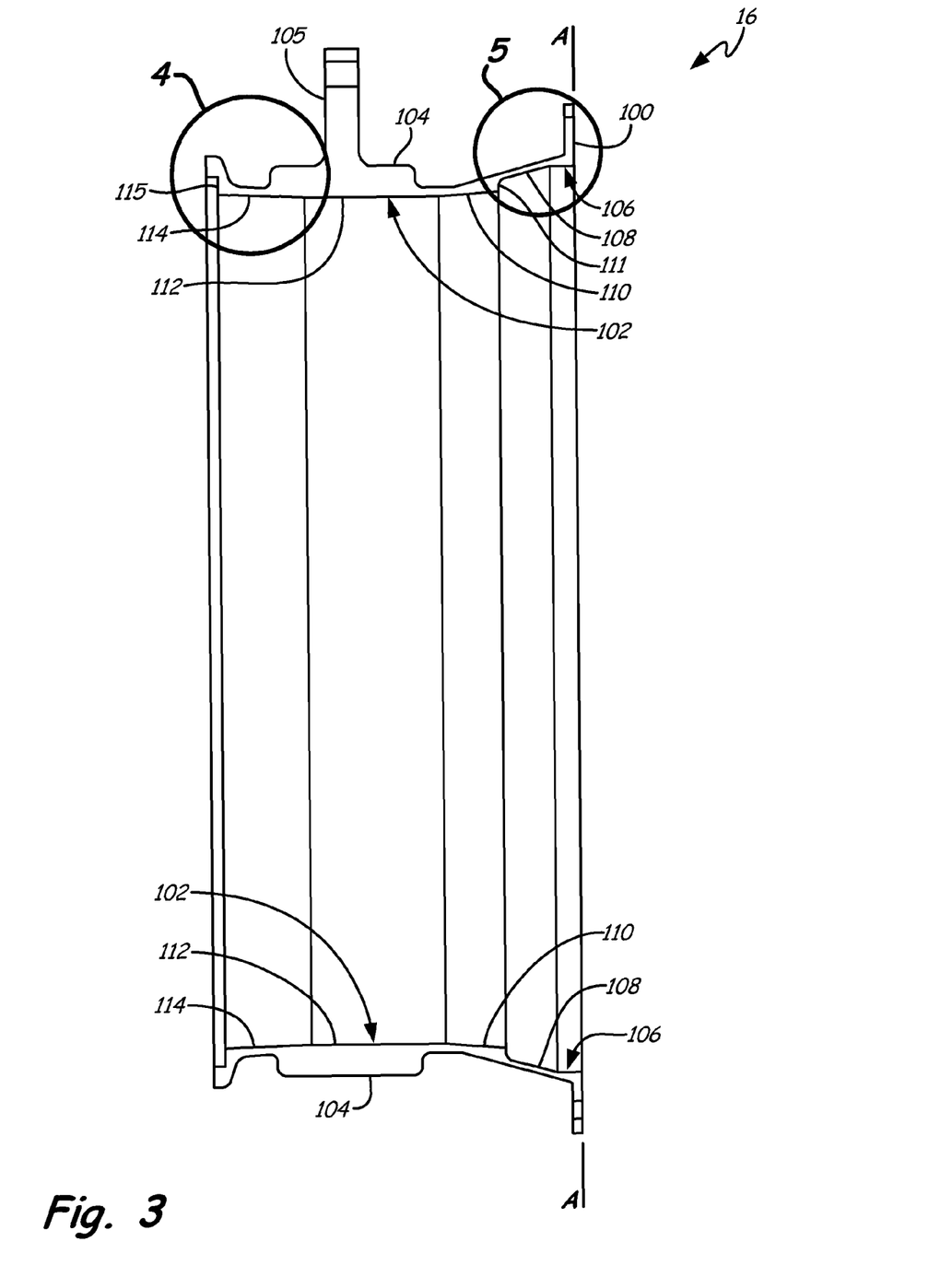
FIG. 3 is a cross-sectional view of the inlet housing of FIG. 2.

FIG. 2 is a perspective view of an embodiment of inlet housing 16 incorporating the present invention. As shown in FIG. 2, inlet housing 16 includes flanged surface 100, interior surface 102, fan rotor containment structure 104, and a plurality of attachment points 105. Attachment points 105 are employed in handling inlet housing 16 during its manufacture and during replacement activities as described above. Interior surface 102 comprises a series of surface sections including flange section 106, transition section 108, outlet section 110, rotor section 112, and inlet section 114. Interior surface 102 is symmetric about an axis of inlet housing 16. Flanged surface 100 is a flat surface that contacts fan housing 12 when inlet housing 16 is attached to fan housing 12 as illustrated in FIG. 1. Once attached to fan housing 12, the axis of inlet housing 16 is, ideally, aligned with the axis of rotation for ram air fan assembly 10 described above in reference to FIG. 1. Flange section 106 abuts flanged surface 100. Transition section 108 abuts flange section 106 opposite flanged surface 100. Outlet section 110 abuts transition section 108 and extends to rotor section 112. Inlet section 114 abuts rotor section 112 opposite outlet section 110. Each of the surface sections of interior surface 102 have unique positions and angles as shown in FIG. 3 and described below. This unique arrangement provides an enhanced flow path to improve the fan efficiency of fan rotor 42 once inlet housing 16 is installed on ram air fan assembly 10 as illustrated in FIG. 1.

Figure 4:
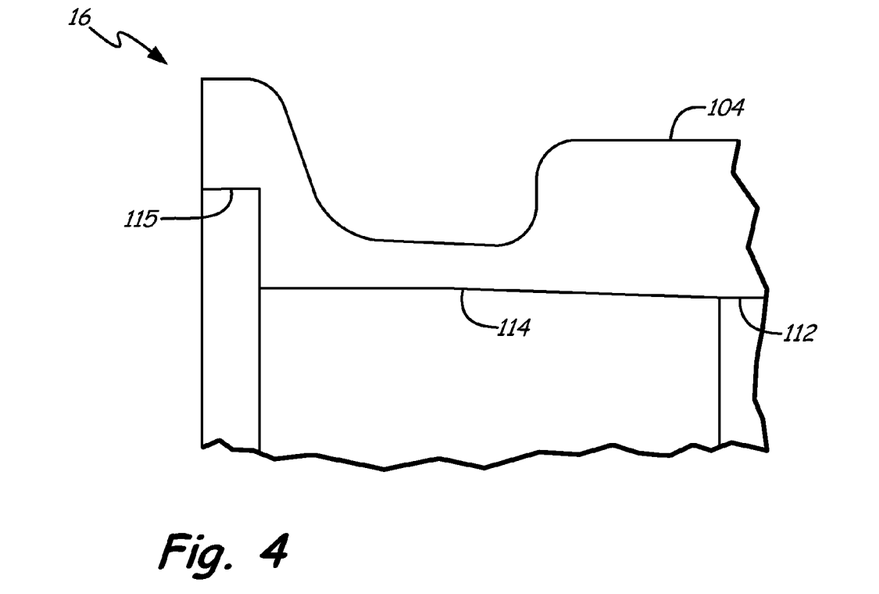
FIG. 4 is a cross-sectional view of a portion of the inlet housing of FIG. 3.
Figure 5:
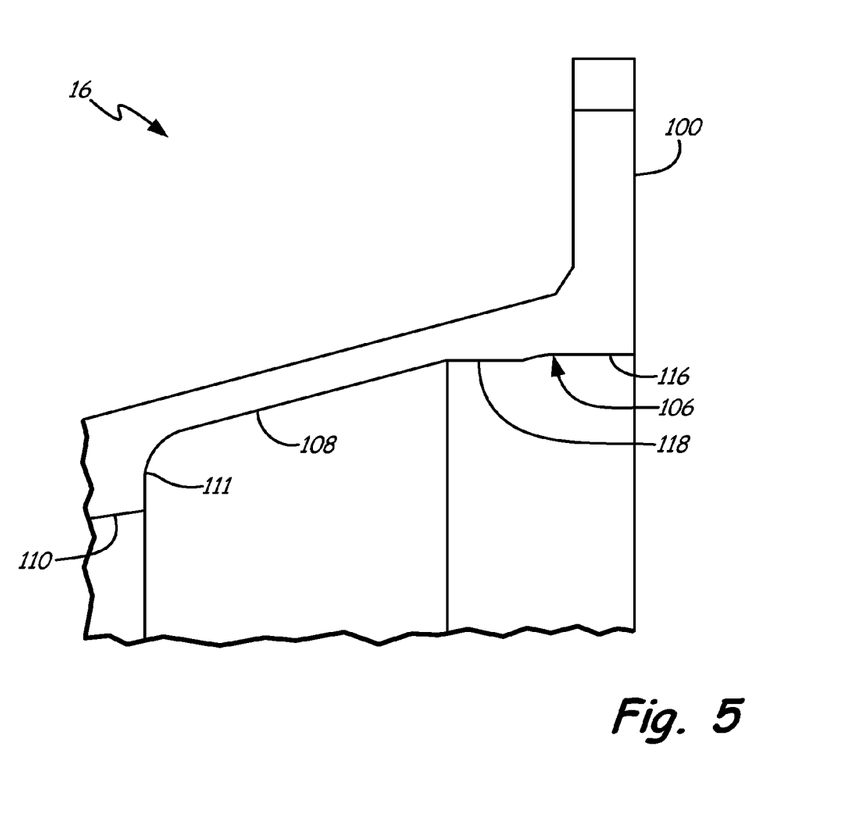
FIG. 5 is a cross-sectional view of another portion of the inlet housing of FIG. 3.

FIG. 3 is a cross-sectional view of inlet housing 16 of FIG. 2. FIGS. 4 and 5 are cross-sectional views of different portions of the inlet housing of FIG. 3 enlarged to show additional details. FIG. 3 shows the unique positions and angles of inlet housing 16 that provide the enhanced flow path and maintain the enhanced flow path to fan housing 12. Flanged surface 100 defines reference flange plane A, which is perpendicular to the axis of inlet housing 16. Flange section 106 abuts flanged surface 100 and is cylindrical in shape. Flange section 106 has a nominal diameter of 13.763 inches (349.58 mm). Additional detail regarding flange section 106 is provided below in reference to FIG. 5.

FIG. 3 also illustrates that transition section 108 abuts flange section 106 and has a frustoconical shape. Like all surface sections of interior surface 102, transition section 108 is symmetric about the axis of inlet housing 16. Transition section 108 extends away from flange section 106 and radially inward toward the axis of inlet housing 16 at an angle between 14.50 and 15.50 degrees from the axis such that transition section 108 has a diameter of between 13.580 inches and 13.600 inches (or between 344.93 mm and 345.44 mm) at a plane parallel to, and between 0.715 inches and 0.735 inches (or 18.16 mm and 18.67 mm) from, reference flange plane A.

As shown in FIG. 3, outlet section 110 also has a frustoconical shape. Outlet section 110 abuts transition section 108 at a plane parallel to, and between 1.150 inches and 1.160 inches (or between 29.21 mm and 29.46 mm) from, reference flange plane A; and extends away from the transition section and radially inward toward the axis at an angle between 4.00 and 5.00 degrees from the axis such that the outlet section has a diameter between 12.940 inches and 12.960 inches (or between 328.68 mm and 329.18 mm) at a plane parallel to, and between 1.610 inches and 1.630 inches (or 40.89 mm and 41.40 mm) from, reference flange plane A. This positioning of outlet section 110 relative to transition section 108 has the effect of creating step 111 in interior surface 102 at the interface between transition section 108 and outlet section 110, as shown in FIG. 3. Rotor section 112 abuts outlet section 110 opposite transition section 108. Rotor section 112 has a cylindrical shape and a diameter between 12.876 inches and 12.882 inches (or between 327.05 mm and 327.20 mm).

Inlet section 114 has a frustoconical shape more clearly illustrated in FIG. 4. FIG. 4 shows that inlet section 114 abuts rotor section 112 (opposite outlet section 110) and extends away from outlet section 110 and radially outward from the axis of inlet housing 16 at an angle of between 1.50 and 2.50 degrees from the axis such that inlet section 16 has a diameter of between 12.925 inches and 12.945 inches (or between 328.30 mm and 328.80 mm) at a plane parallel to, and between 4.875 inches and 4.895 inches (or between 123.83 mm and 124.33 mm) from, reference flange plane A.

As noted above, flange section 106 has a nominal diameter of 13.763 inches (349.58 mm). However, flange section 106 includes two parts each with specific diameter requirements. As shown in FIG. 5, flange section 106 includes first part 116 and second part 118. First part 116 abuts flanged surface 100 and has a diameter between 13.762 inches and 13.764 inches (or between 349.55 mm and 349.61 mm). Second part 118 abuts first part 116 at a plane parallel to, and at least 0.185 inches (or at least 4.70 mm) from, reference flange plane A. Second part 118 has a diameter equal to or less than the diameter of first part 116 by no more than 0.010 inches (or no more than 0.25 mm). This precise arrangement of first part 116 and second part 118 of flange section 106 ensures that when combined with the requirements above for the balance of interior surface 102, and when combined with tolerances of the rest of ram air fan assembly 10, the clearance between fan rotor 40 and inlet housing 16 is held to a narrow gap to enhance fan efficiency while also keeping the risk of fan rotor 42 rubbing inlet housing 16 low.

As noted above, the ability to manufacture inlet housing 16 separately from fan housing 12 permits the use of methods and materials ideal for inlet housing 16 that would not be acceptable for fan housing 12. The embodiment illustrated in reference to FIGS. 3-5 is made of, for example, tempered aluminum alloy, such as 6061-T6 or 6061-T6511, as such materials are known in the art. The ability to use such high strength materials reduces the amount of material required for the necessary containment performance, thereby reducing the weigh of aircraft that employ an embodiment of inlet housing 16 of the present invention.

FIG. 3 also illustrates additional details for containment structure 104. As shown in FIG. 3, containment structure 104 extends over at least a portion of rotor section 112 and a portion of inlet section 114. Containment structure 104 has a thickness of at least 0.440 inches (or at least 11.18 mm) over the portion of rotor section 112 as measured radially outward from rotor section 112 of interior surface 102. Containment structure 104 is slightly thinner over the portion of inlet section 114 due to the frustoconical shape of inlet section 114. In the embodiment illustrated in reference to FIGS. 3-5, containment structure 104 extends axially from a plane parallel to, and between 2.415 inches and 2.435 inches (or between 61.34 mm and 61.84 mm) from, reference flange plane A to a plane parallel to, and between 4.605 inches and 4.625 inches (or between 116.97 mm and 117.48 mm) from, reference flange plane A.

As shown in FIG. 3, inlet housing 16 includes interface connection notch 115 abutting inlet section 114 for connecting an inlet duct (not shown) to inlet housing 16 by, for example, clamps or rings, giving inlet housing 16 a total overall axial length of between 5.580 inches and 5.590 inches (or between 141.73 mm and 141.99 mm).

An inlet housing for a ram air fan that embodies the present invention is a separate part from the fan housing with an interior profile or contour specifically designed to enhance fan efficiency in the ram air fan assembly. The design and tolerances of the inlet housing described above are such that, when combined with known tolerances of the rest of the ram air fan assembly, the clearance between the fan rotor and the inlet housing is held to a narrow gap to enhance fan efficiency, while also keeping the risk of the fan rotor rubbing the inlet housing low. In addition, in the present invention, only the inlet housing, which is easily accessible at the front of the ram air fan assembly, need be replaced, resulting in significant savings. Finally, the inlet housing includes an integral containment structure that provides a necessary level of protection for exterior components in the event of a rotor burst. Because the inlet housing is separate from the fan housing, it can be manufactured with techniques and materials better suited for containment purposes than the casting techniques and materials necessarily employed in the production of a fan housing. Thus, the containment structure is lighter, reducing the weight of the ram air fan assembly.

Novel aspects of inlet housing 16, including interior surface 102 and containment structure 104 of the present invention described herein are achieved by substantial conformance to specified geometries. It is understood that edge breaks and curved radii not specifically described herein, but normally employed in the art, may be added to inlet housing 16 to enhance manufacturability, ease assembly, or improve durability while retaining substantial conformance to specified geometries. For example, it is understood that first part 116 still abuts flanged surface 100 as described above, should an edge break be added to a corner edge formed where first part 116 abuts flanged surface 100; or that corners between surface sections of interior surface 102 may employ curved radii and still be in substantial conformance.

Alternatively, substantial conformance is based on a determination by a national or international regulatory body, for example in a part certification or parts manufacture approval (PMA) process for the Federal Aviation Administration, the European Aviation Safety Agency, the Civil Aviation Administration of China, the Japan Civil Aviation Bureau, or the Russian Federal Agency for Air Transport. In these embodiments, substantial conformance encompasses a determination that a particular ram air fan inlet housing is identical to, or sufficiently similar to, the specified inlet housing 16 comprising interior surface 102 and containment structure 104, or that the ram air fan inlet housing is sufficiently the same with respect to a part design in a type-certified ram air fan inlet housing, such that the ram air fan inlet housing complies with airworthiness standards applicable to the specified ram air fan inlet housing. In particular, substantial conformance encompasses any regulatory determination that a particular part or structure is sufficiently similar to, identical to, or the same as a specified inlet housing 16 of the present invention, such that certification or authorization for use is based at least in part on the determination of similarity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air fan inlet housing for containing a ram air fan rotor, the inlet housing comprising:
   a flanged surface perpendicular to an axis of the inlet housing, the flanged surface defining a flange plane at an axial end of the inlet housing and;
   an interior surface symmetric about the axis of the inlet housing, the axisymmetric interior surface comprising:
      a flange section having a cylindrical shape, the flange section abutting the flanged surface;
      a transition section having a frustoconical shape, the transition section abutting the flange section opposite the flanged surface and extending away from the flange section and radially inward toward the axis at an angle between 14.50 and 15.50 degrees from the axis;
      an outlet section having a frustoconical shape, the outlet section abutting the transition section at a plane parallel to, and between 1.150 inches and 1.160 inches (or between 29.21 mm and 29.46 mm) from, the flange plane; and extending away from the transition section and radially inward toward the axis at an angle between 4.00 and 5.00 degrees from the axis; such that a step is formed between the transition section and the outlet section;
      a rotor section having a cylindrical shape, the rotor section abutting the outlet section opposite the transition section; and
      an inlet section having a frustoconical shape, the inlet section abutting the rotor section opposite the outlet section and extending away from the outlet section and radially outward from the axis at an angle of between 1.50 and 2.50 degrees from the axis.

2. The inlet housing of claim 1, wherein the flange section has a diameter of between 13.752 inches and 13.764 inches (or between 349.30 mm and 349.61 mm); the transition section has a diameter between 13.580 inches and 13.600 inches (or between 344.93 mm and 345.44 mm) at a plane parallel to, and between 0.715 inches and 0.735 inches (or 18.16 mm and 18.67 mm) from, the flange plane; the outlet section has a diameter between 12.940 inches and 12.960 inches (or between 328.68 mm and 329.18 mm) at a plane parallel to, and between 1.610 inches and 1.630 inches (or 40.89 mm and 41.40 mm) from, the flange plane; a rotor section has a diameter between 12.876 inches and 12.882 inches (or between 327.05 mm and 327.20 mm); and the inlet section has a diameter of between 12.925 inches and 12.945 inches (or between 328.30 mm and 328.80 mm) at a plane parallel to, and between 4.875 inches and 4.895 inches (or between 123.83 mm and 124.33 mm) from, the flange plane.

3. The inlet housing of claim 1, further comprising:
   a fan rotor containment structure extending radially outward from the axisymmetric interior surface over at least a portion of the rotor section and at least a portion of the inlet section, the containment structure having a thickness of at least 0.440 inches (or at least 11.18 mm) over the portion of the rotor section.

4. The inlet housing of claim 3, wherein the fan rotor containment structure extends axially from a plane parallel to, and between 2.415 inches and 2.435 inches (or between 61.34 mm and 61.84 mm) from, the flange plane to a plane parallel to, and between 4.605 inches and 4.625 inches (or between 116.97 mm and 117.48 mm) from, the flange plane.

5. The inlet housing of claim 1, wherein the flange section interior surface comprises:
   a first part abutting the flanged surface and having a diameter between 13.762 inches and 13.764 inches (or between 349.55 mm and 349.61 mm); and
   a second part abutting the first part at a plane parallel to, and at least 0.185 inches (or at least 4.70 mm) from, the flange plane; the second part having a diameter equal to or less than the diameter of the first part by no more than 0.010 inches (or nor more than 0.25 mm).

6. The inlet housing of claim 1, wherein the length of the inlet housing in the axial direction is between 5.580 inches and 5.590 inches (or between 141.73 mm and 141.99 mm).

7. The inlet housing of claim 1, wherein the inlet housing is at least one of 6061-T6 aluminum alloy and 6061-T6511 aluminum alloy.

8. A ram air fan assembly comprising:
   a fan housing;
   a fan motor attached to the fan housing;
   a fan rotor;
   a thrust shaft connecting the fan motor to the fan rotor; and
   a fan inlet housing attached to the fan housing and containing the fan rotor, the inlet housing comprising
      a flanged surface perpendicular to an axis of the inlet housing, the flanged surface defining a flange plane at an axial end of the inlet housing; the fan inlet housing attaching to the fan housing at the flanged surface;
      an interior surface symmetric about the axis of the inlet housing, the axisymmetric interior surface comprising:
         a flange section having a cylindrical shape, the flange section abutting the flanged surface;
         a transition section having a frustoconical shape, the transition section abutting the flange section opposite the flanged surface and extending away from the flange section and radially inward toward the axis at an angle between 14.50 and 15.50 degrees from the axis;
         an outlet section having a frustoconical shape, the outlet section abutting the transition section at a plane parallel to, and between 1.150 inches and 1.160 inches (or between 29.21 mm and 29.46 mm) from, the flange plane; and extending away from the transition section and radially inward toward the axis at an angle between 4.00 and 5.00 degrees from the axis; such that a step is formed between the transition section and the outlet section;

a rotor section having a cylindrical shape, the rotor section abutting the outlet section opposite the transition section; and an inlet section having a frustoconical shape, the inlet section abutting the rotor section opposite the outlet section and extending away from the outlet section and radially outward from the axis at an angle of between 1.50 and 2.50 degrees from the axis.

9. The ram air fan assembly of claim 8, wherein the flange section has a diameter of between 13.752 inches and 13.764 inches (or between 349.30 mm and 349.61 mm); the transition section has a diameter between 13.580 inches and 13.600 inches (or between 344.93 mm and 345.44 mm) at a plane parallel to, and between 0.715 inches and 0.735 inches (or 18.16 mm and 18.67 mm) from, the flange plane; the outlet section has a diameter between 12.940 inches and 12.960 inches (or between 328.68 mm and 329.18 mm) at a plane parallel to, and between 1.610 inches and 1.630 inches (or 40.89 mm and 41.40 mm) from, the flange plane; a rotor section has a diameter between 12.876 inches and 12.882 inches (or between 327.05 mm and 327.20 mm); and the inlet section has a diameter of between 12.925 inches and 12.945 inches (or between 328.30 mm and 328.80 mm) at a plane parallel to, and between 4.875 inches and 4.895 inches (or between 123.83 mm and 124.33 mm) from, the flange plane.

10. The ram air fan assembly of claim 8, wherein the fan inlet housing further comprises:

a fan rotor containment structure extending radially outward from the axisymmetric interior surface over at least a portion of the rotor section and at least a portion of the inlet section, the containment structure having a thickness of at least 0.440 inches (or at least 11.18 mm) over the portion of the rotor section.

11. The ram air fan assembly of claim 10, wherein the fan rotor containment structure extends axially from a plane parallel to, and between 2.415 inches and 2.435 inches (or between 61.34 mm and 61.84 mm) from, the flange plane to a plane parallel to, and between 4.605 inches and 4.625 inches (or between 116.97 mm and 117.48 mm) from, the flange plane.

12. The ram air fan assembly of claim 8, wherein the interior surface of the flange section of the fan inlet housing comprises:

a first part abutting the flanged surface and having a diameter between 13.762 inches and 13.764 inches (or between 349.55 mm and 349.61 mm); and a second part abutting the first part at a plane parallel to, and at least 0.185 inches (or at least 4.70 mm) from, the flange plane; the second part having a diameter equal to or less than the diameter of the first part by no more than 0.010 inches (or nor more than 0.25 mm).

13. The ram air fan assembly of claim 8, wherein the length of the inlet housing in the axial direction is between 5.580 and 5.590 inches (or between 141.73 mm and 141.99 mm).

14. The ram air fan assembly of claim 8, wherein the inlet housing is at least one of 6061-T6 aluminum alloy and 6061-T6511 aluminum alloy.

* * * * *